March 20, 1956  R. D. INGALLS  2,739,251
AIR-COOLED ELECTRIC CLUTCH-BRAKE DRIVING DEVICES
Filed May 1, 1952  3 Sheets-Sheet 1

INVENTOR.
Ross D. Ingalls
BY
William P. Stewart
ATTORNEY

WITNESS
Nicholas Leszczak

March 20, 1956  R. D. INGALLS  2,739,251
AIR-COOLED ELECTRIC CLUTCH-BRAKE DRIVING DEVICES
Filed May 1, 1952  3 Sheets-Sheet 2

INVENTOR.
Ross D. Ingalls
BY
William P. Stewart
ATTORNEY

WITNESS
Nicholas Leszczak

United States Patent Office 2,739,251
Patented Mar. 20, 1956

2,739,251

AIR COOLED ELECTRIC CLUTCH-BRAKE DRIVING DEVICES

Ross D. Ingalls, New Providence, N. J., assignor to The Singer Manufacturing Company, Elizabeth, N. J., a corporation of New Jersey Application May 1, 1952, Serial No. 285,441

6 Claims. (Cl. 310—59)

This invention relates to electric clutch-brake driving devices or transmitters and more particularly to means for cooling the parts of such a driving device.

An object of the invention is to provide a clutch-brake driving device with a driving motor which is totally enclosed.

Another object of the invention is to provide means for cooling the totally enclosed motor.

A further object of the invention is to provide a ventilated casing for the clutch-brake mechanism.

A still further object of the invention is to provide cooling air passages which are easily cleaned.

Figure 1:
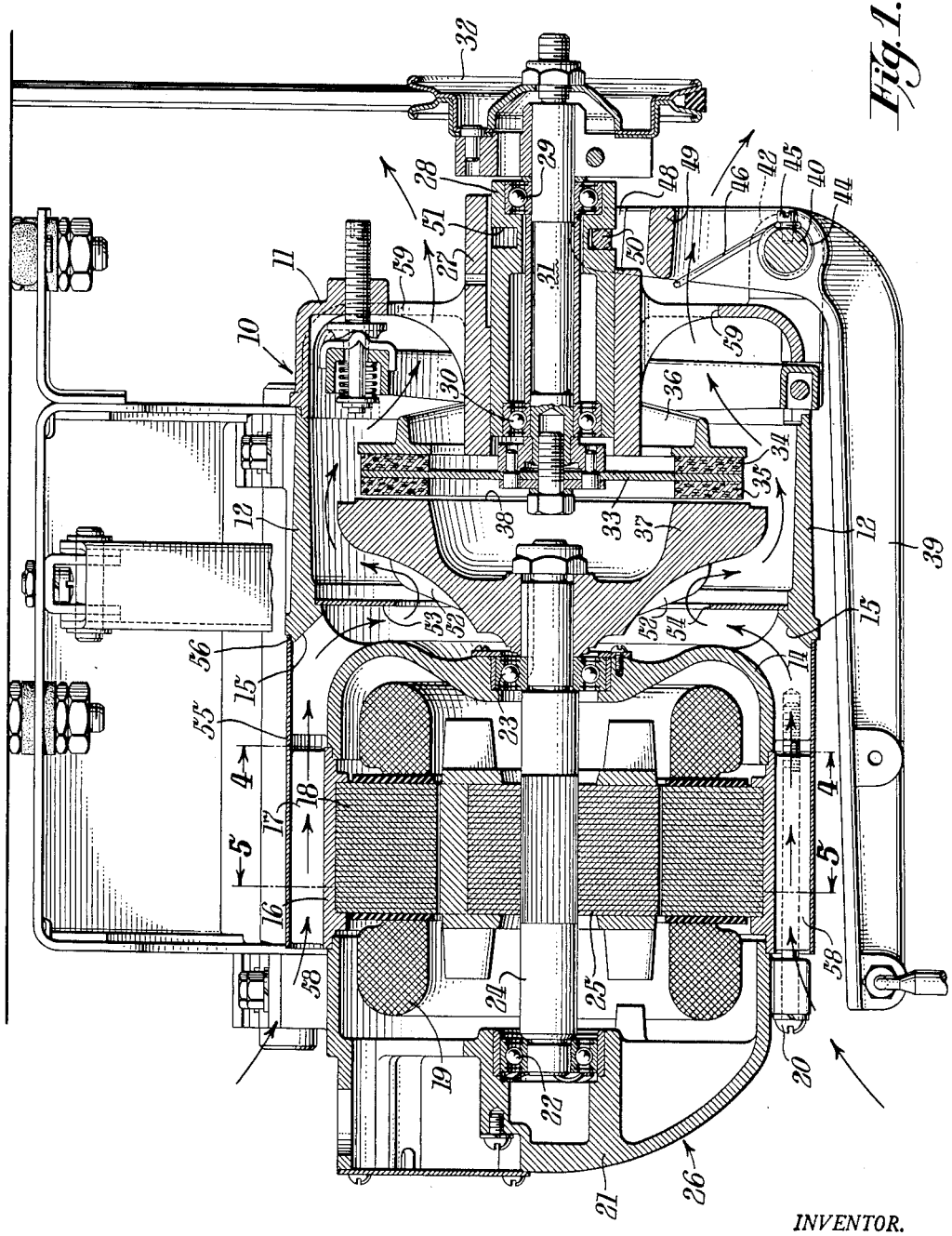
Fig. 1 is a sectional view in elevation taken substantially through the center of the clutch-brake driving device.
Figure 2:
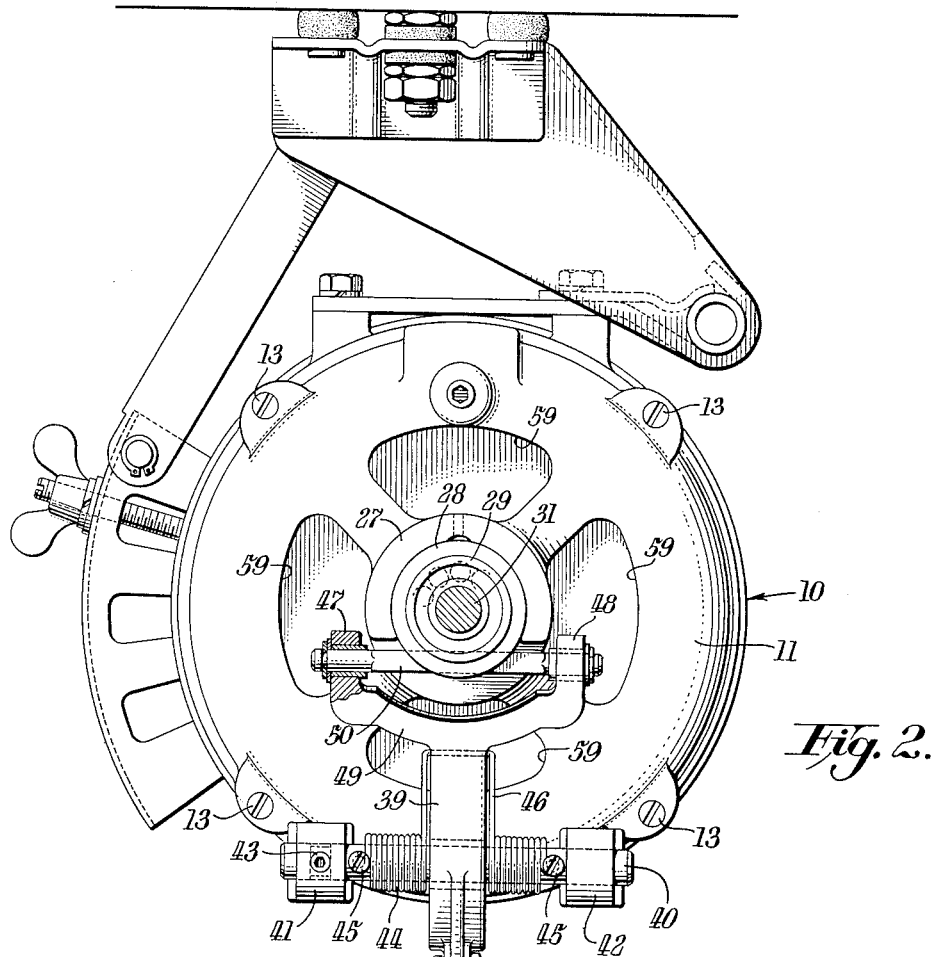
Fig. 2 is a right end view, partly in section, of the transmitter shown in Fig. 1.
Figure 3:
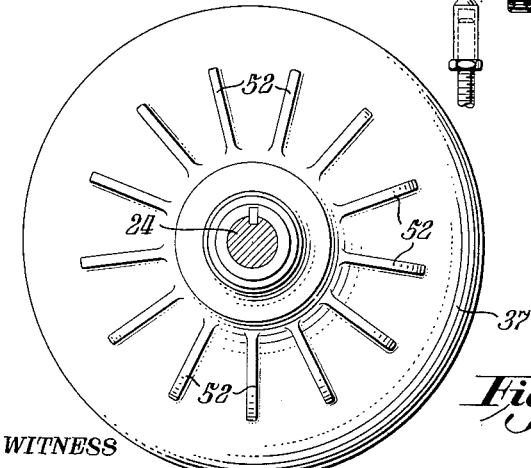
Fig. 3 is an elevational view of the flywheel showing the cooling fan blades.
Figure 4:
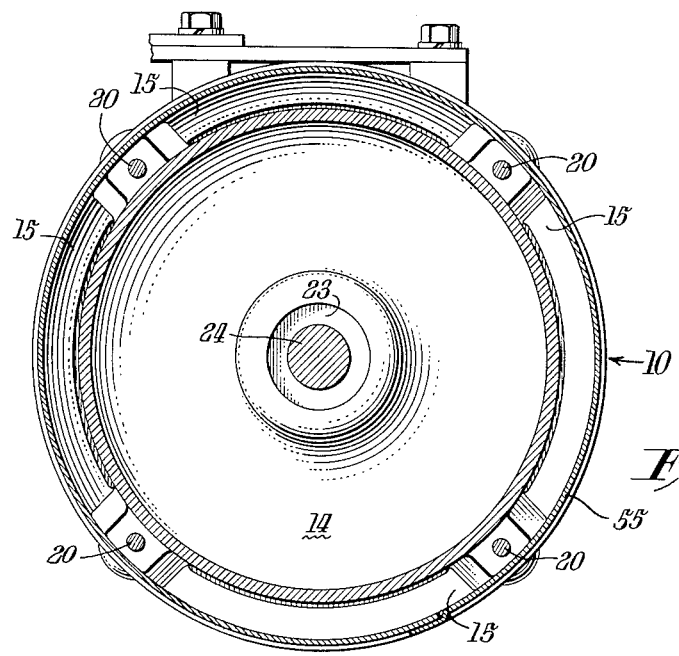
Fig. 4 is a sectional view taken substantially on line 4—4 of Fig. 1.
Figure 5:
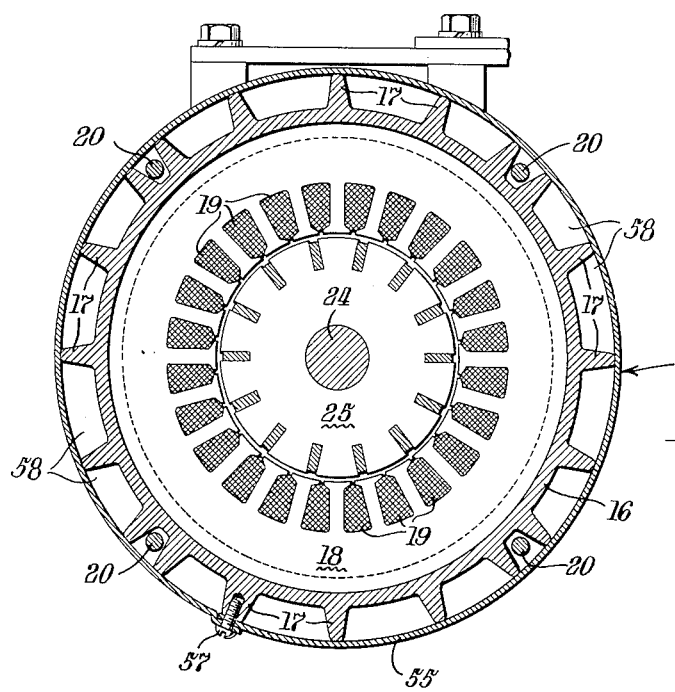
Fig. 5 is a sectional view taken substantially on line 5—5 of Fig. 1.

Referring more specifically to the drawings, a clutch-brake driving device or transmitter is shown having a casing 10 made up of two parts, an end cap 11 and a cylindrical body portion 12. The two parts are held together by four screws 13. An end wall 14 partially closes the rear end of the cylindrical body portion 12 but air inlet openings 15 are provided around the outer edge of the web 14 to permit cooling air to enter the casing 10. One side of the end wall 14 is formed in the shape of a motor end-closure bell and carries a stator frame 16 provided with longitudinally disposed cooling ribs 17. The stator frame 16 carries stator laminations 18 and a stator winding 19. Long screws 20 hold a rear motor end-closure 21 in place against the stator frame 16 and also secure the stator frame 16 in place on the end wall 14. An anti-friction bearing 22 carried by the end closure 21 and a sealed type anti-friction bearing 23 carried by the end wall 14 rotatably support a motor rotor shaft 24 which extends into the casing 10. The rotor shaft 24 carries a motor rotor 25 of a conventional type. This construction provides a motor housing which is totally enclosed and sealed against dirt.

The end cap 11 of the casing 10 is formed with a central tubular support 27 which slidably and rotatably carries a control sleeve 28. Two spaced ball bearings 29 and 30 are fitted into the bore of the sleeve 28 and carry a driven shaft 31 which is rotatable relative to the sleeve 28 and slidable with the sleeve. The outer end of the driven shaft 31 carries a driven pulley assembly 32 and a clutch disc 33 carrying friction facings 34 and 35 on either side is fastened to the inner end of the driven shaft 31. A brake 36 is carried by the end closure bell 11 on one side of the disc 33. A cup-shaped imperforate flywheel 37 is fastened to the rotor shaft 24 on the other side of the disc 33 and is provided with a clutch surface 38 engageable by the friction facing 35. An L-shaped clutch and brake actuating lever 39 is pivotally carried by a pin 40 which is supported in two bosses 41 and 42 formed on the end cap 11. A set screw 43 threaded into the boss 41 engages the pin 40 to hold it against rotation relative to the bosses 41 and 42. A coil spring 44 is wrapped around the pin 40 on either side of the actuating lever 39 and has its two ends fastened to the pin 40 by screws 45 threaded into the pin 40. A central loop portion 46 of the spring 44 engages the lever 39 at a position remote from the axis of the pin 40 to urge the lever in a clockwise direction about the pin 40, as viewed in Fig. 1. The arms 47 and 48 of a yoke 49 formed on one end of the lever 39 carry a pin 50 which extends between them. The pin 50 passes below the driven shaft 31 through a circumferential groove 51 formed in the slidable sleeve 28. Motion of the lever 39 about the pivot pin 40 moves the sleeve 28 and, therefore, the driven shaft 31 axially in the end cap 11.

In order to circulate cooling air over the device, a series of fan blades 52 is formed on the rear of the flywheel 37 adjacent the end wall 14. An annular baffle ring 53 carried by the casing portion 12 is disposed between the end wall 14 and the fan blades 52 and is provided with a central opening 54. A cylindrical shroud 55 of sheet material is supported on the ribs 17 and engages a shoulder 56 formed on the casing portion 12. The shroud is held in place by a screw 57 threaded into one of the ribs 17. When the shroud 55 is secured in place on the ribs 17, the spaces 58 between the ribs 17 form air passages leading to the openings 15 in the casing web 14. Air outlet openings 59 are formed in the casing end cap 11 to permit warm air to escape from the casing.

In view of the above description, it is believed that the operation and advantages of this device will now be readily understood. In transmitters of the type in which cooling air is forced directly through the motor in order to cool the motor, quantities of dirt are likely to accumulate in the motor bearings and windings which causes undesirable wear and heating. A few constructions have embodied a totally enclosed motor in a transmitter but have then forced air over the motor which has already passed over the heated clutch and brake surfaces resulting in inadequate cooling of the motor. In my construction, when the motor windings 19 are energized and the shaft 24 rotates, the fan blades 52 on the flywheel 37 force cooling air to flow in the direction of the arrows shown in Fig. 1. The baffle ring 53 causes the fan blades 52 to function as the blades of a centrifugal type fan which draws air through the central opening 54 in the ring 53 and forces it radially outwardly over the rear surface of the flywheel. This centrifugal fan action causes cool air to be drawn in through the air passages 58 to cool the motor indicated generally at 26. The air is then forced through the casing 10 to cool the friction surfaces of the clutch and brake mechanism and is finally exhausted through the outlet openings 59. This direction of air flow causes the cooling air to pass over the totally enclosed motor first, where the cooling effect is most needed, and then over the clutch and brake surfaces which require less cooling.

Of course, it is readily apparent that in my construction the air passages can be easily cleaned, in the event that they become clogged with dirt, by merely removing the shroud 55 and cleaning any accumulated dirt from the ribs 17. Further, upon removal of the four screws 13, the end cap 11 carrying the clutch and brake mechanism can be removed as a unit for cleaning and repairs. This construction provides a unit which is simple in construction, readily serviced, and amply cooled.

Having thus set forth the nature of the invention, what I claim herein is:

1. An electric clutch-brake driving device comprising a casing provided with air inlet and outlet openings, a totally enclosed motor having a frame carried by said casing and provided with air passages alined with said inlet openings, a motor rotor shaft forming a part of said motor and extending into said casing, a clutch mechanism disposed in said casing including an imperforate flywheel fastened to said rotor shaft, and a series of fan blades formed on said flywheel operable to draw air through the passages over said frame and exhaust air through said outlet openings.

2. An electric clutch-brake driving device comprising a totally enclosed electric motor having a housing, said housing comprising a stator frame having longitudinal ribs and an end closure bell, a clutch casing formed integrally with said closure bell and provided with air inlet and outlet openings, a motor rotor shaft journaled in said closure bell and extending into said casing, a clutch mechanism disposed within said casing, a series of fan blades carried by said rotor shaft, and a removable shroud surrounding said motor housing, and supported on said ribs to form longitudinal air passages aligned with said air inlet openings.

3. An electric clutch-brake driving device comprising a cylindrical ventilated clutch casing and a totally enclosed electric motor, an end wall formed integrally with said casing and partially closing one end of said casing, said end wall forming an end closure bell of said motor, cooling ribs formed on said motor, a detachable shroud surrounding said motor and supported on said cooling ribs, and a fan and a clutch-brake mechanism disposed within said casing, said fan being adapted to draw air over said motor and exhaust air through said casing.

4. An electric clutch-brake driving device comprising a totally enclosed electric driving motor having an end closure bell, a ventilated casing having one end partially closed by said end closure bell, clutch mechanism within said casing, a motor rotor shaft journaled in said end closure bell and extending into said casing, an imperforate flywheel carried by said shaft within said casing, fan blades formed on the face of said flywheel proximate to said closure bell, and a baffle ring disposed between said fan blades and said end closure bell.

5. An electric clutch-brake driving device comprising a ventilated casing having air outlet openings in one end, a totally enclosed electric motor having an end closure bell partially closing the other end of said casing, clutch mechanism within said casing, a motor rotor shaft journaled in said closure bell and extending into said casing, an imperforate flywheel carried by said shaft within said casing, fan blades formed on the face of said flywheel proximate to said closure bell, a baffle ring disposed between said fan blades and said end closure bell, a removable shroud surrounding said motor, and means spacing said shroud from said casing to form an air passage between said casing and said shroud.

6. An electric clutch-brake driving device comprising a casing provided with air inlet and exhaust openings, a clutch mechanism disposed within said casing, a totally enclosed electric motor carried by said casing and including a housing provided with air passages aligned with said air inlet openings in said casing, a rotor shaft forming a part of said motor and extending into said casing, an imperforate flywheel disposed within said casing and carried by said shaft, said flywheel forming one element of said clutch mechanism, centrifugal fan blades formed on one face of said flywheel adjacent to said motor housing, and an annular baffle plate disposed between said motor housing and said flywheel, said baffle having a central opening through which said fan draws cooling air.

References Cited in the file of this patent

UNITED STATES PATENTS

| 2,058,572 | Delaval-Crow | Oct. 27, 1936 |
| 2,321,126 | Breuer | June 8, 1943 |

FOREIGN PATENTS

| 14,022 | Great Britain | of 1914 |
| 133,020 | Switzerland | July 16, 1929 |
| 200,568 | Switzerland | Jan. 2, 1939 |
| 622,441 | Great Britain | May 2, 1949 |